United States Patent [19]

Itzov

[11] Patent Number: 4,648,758

[45] Date of Patent: Mar. 10, 1987

[54] TWO POSITION LINKAGE

[75] Inventor: Andrew L. Itzov, Menomonee Falls, Wis.

[73] Assignee: Milwaukee Electric Tool Corporation, Brookfield, Wis.

[21] Appl. No.: 750,185

[22] Filed: Jul. 1, 1985

[51] Int. Cl.[4] .......... B23B 45/06

[52] U.S. Cl. .......... 408/136; 74/522; 408/712

[58] Field of Search .......... 408/129, 136, 712; 74/522, 526, 525

[56] References Cited

U.S. PATENT DOCUMENTS

| | | | |
|---|---|---|---|
| 1,272,108 | 7/1918 | Robb et al. | 408/136 |
| 1,927,006 | 9/1933 | Guibert et al. | 408/136 |
| 2,477,916 | 8/1949 | Wilhide | 408/712 |
| 3,153,950 | 10/1964 | Andrews | 74/522 |

FOREIGN PATENT DOCUMENTS

| | | | |
|---|---|---|---|
| 2110924 | 9/1972 | Fed. Rep. of Germany | 408/712 |

*Primary Examiner*—John Sipos
*Assistant Examiner*—Donald R. Studebaker
*Attorney, Agent, or Firm*—Bayard H. Michael

[57] ABSTRACT

The drill stand has a vertical column and a clamp moveably mounted on the column. A carriage adapted to support a drill is moveably mounted on the column for movement with and with respect to the clamp. A link is pivoted on the clamp and has two pivot locations. A lever arm is pivotally connected to the carriage and has two roller pivots selectively engageable with either of the pivot locations to change the force multiplication and travel distance as the arm is pivoted about the selected pivot location. Each pivot location is at the end of a track having one portion on a curve centered on the link connection to the clamp and another portion on an arc centered on the pivot location associated with the other of the tracks. Each roller engages one of the tracks. The pivot locations are closer together than are the rollers so only one roller can be in a pivot location at one time. The link can be moved about its pivot connection to the clamp to select which of the rollers will be in its associated pivot location. A detent arrangement, including a protrusion on the link and a leaf spring engageable with the protrusion when said arm is raised, acts to retain a selected roller in its pivot location.

8 Claims, 12 Drawing Figures

TWO POSITION LINKAGE

BACKGROUND OF THE INVENTION

Stands for portable drills are provided with a feed handle or lever arm to control feed of the drill bit into the work. The linkage can be changed to change the force multiplication (and, therefore, the travel of the tool). The changeover is time consuming.

The object of the present invention is to simplify the changeover.

SUMMARY OF THE INVENTION

The invention provides a drill stand having a vertical column on which a clamp is moveably mounted. A carriage which supports a drill is moveably mounted on the column for movement with and with respect to the clamp. A link is pivoted on the clamp and has two pivot locations and a lever arm is pivotally connected to the carriage. The lever arm has pivots selectively engagable with either of the pivot locations to change the force multiplication and travel distance as the arm is pivoted about the selected pivot location.

Another feature of the invention is that the pivots are spaced rollers on the lever arm and each pivot location is at the end of a track having one portion on a curve centered on the link pivot connection to the clamp and another portion on an arc centered on the pivot location associated with the other of the tracks.

A further feature is that each of the rollers engages one of said tracks and the pivot locations are closer together than are the rollers so only one roller can be in a pivot location at one time.

Another provision of this invention is that the link can be moved about its clamp pivot, to select which of the rollers will be in its associated pivot location, only when the arm is in its raised position.

The invention includes a detent effective when the arm is in its raised position to yieldably retain a selected roller in its pivot location. The detent includes a protrusion on the link and a leaf spring engagable with the protrusion when the arm is raised. The spring is deflected as the link is moved to change the active pivot.

DETAILED DESCRIPTION OF THE DRAWINGS

Figure 1:
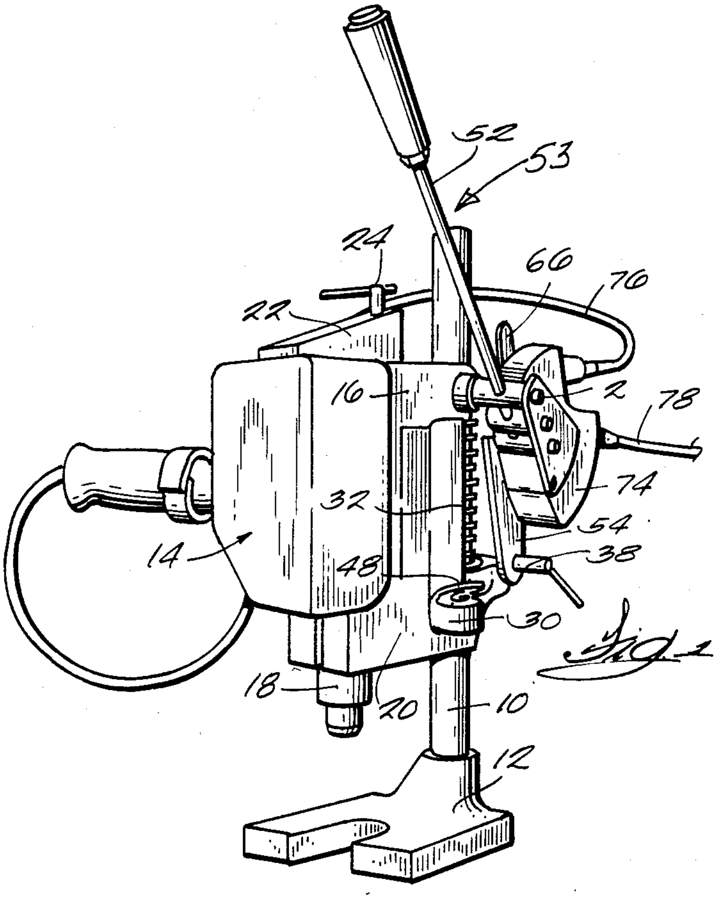
FIG. 1 is a perspective view of a drill stand provided with this invention.
Figure 2:
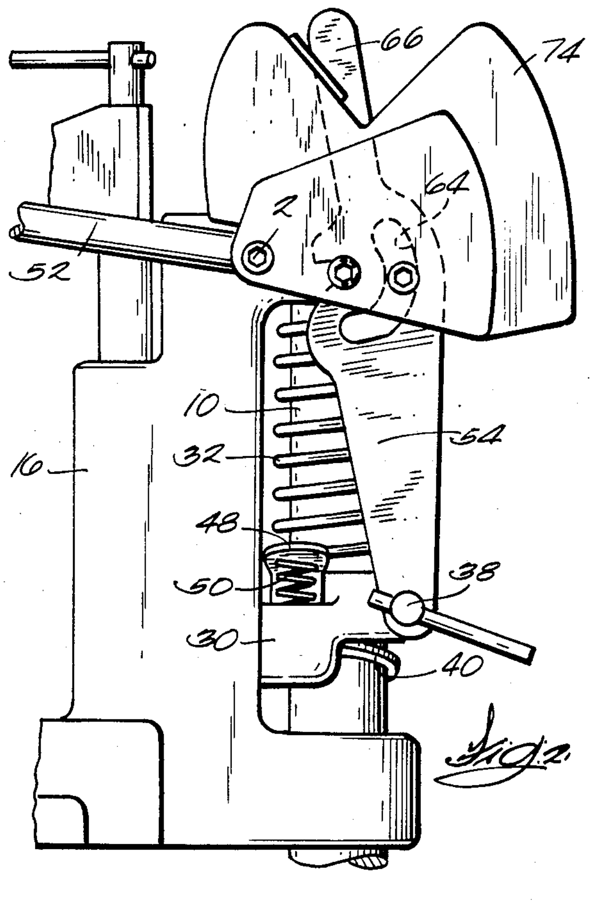
FIG. 2 a side elevation of the stand.
Figure 3:
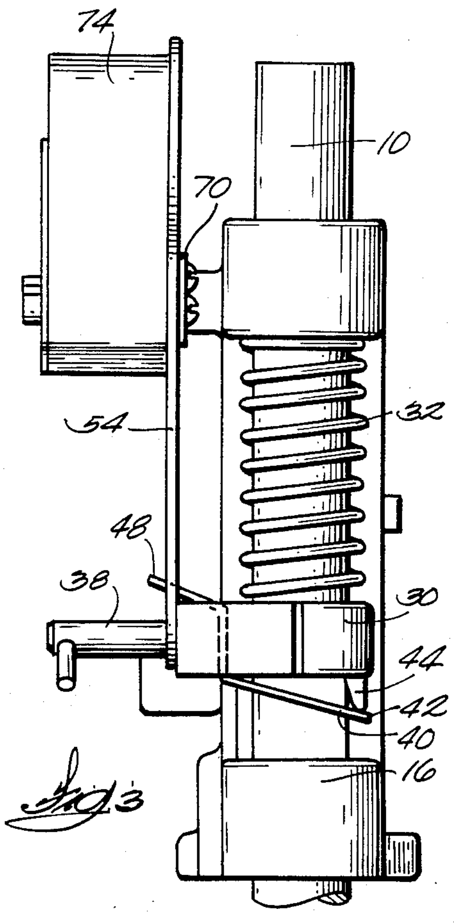
FIG. 3 is a rear elevation of the stand.
Figure 4:
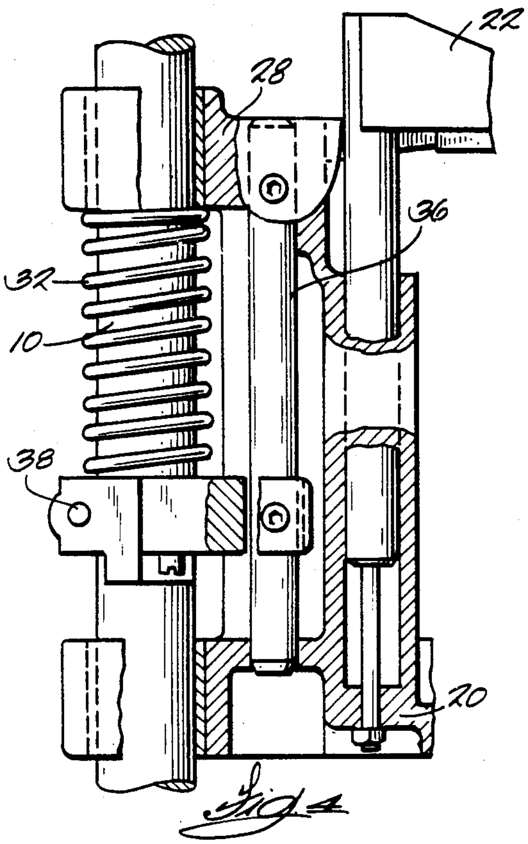
FIG. 4 is a partial elevation with some parts sectioned.

The drill stand has a column 10 fixed in base 12 which can be secured to a bench or the like. Other bases can be used to fix the column to various supports. The drill 14 is secured to carriage 16 to position the drive spindle and chuck 18 vertically. The drill is clamped between support 20 and the follower 22 tightened by screw 24. The carriage has spaced arms, 16, 28 which straddle clamp 30 and have bushings sliding on the column 10.

Spring 32 encircles the column and is compressed between clamp 30 and arm 28 to bias the carriage upwardly to the inactive or raised position with the arm 28 engaging the underside of the clamp. A guide rod 36 is fixed in arm 28 and extends through a bushing in the clamp and is received in the lower arm 16.

The clamp 30 is a split collar encircling column 10. Screw 38 is manually tightened to close the collar on the column or to release the collar. The clamp includes a clamp lock 40 having a hole slightly larger than the diameter of the column over which the lock fits. The lock has a tab 42 which projects under fulcrum or finger 44 depending from the clamp 30. The lock also has an opposed portion 46 which projects upwardly outside the clamp and then projects outwardly to form a pad 48 which overlies spring 50. The spring 50 is compressed between the bottom of a well in the clamp and a thumb pad 48 projecting laterally from the clamp for easy manual access. The user's thumb falls on the pad naturally.

Spring 50 cocks the lock plate 40 on the column by pivoting the plate about finger 44. The weight of the drill and carriage sets up a force couple acting clockwise on the lock plate while the plate engages the column to set up an opposing couple which also includes the force of spring 50. Since the opposing couple includes the spring force, the opposing couple is always greater than the first couple. The lock plate arrangement is claimed in my co-pending application Ser. No. 750,170.

With clamp 30 fixed on the column 10, the long handle portion 52 of the pivoted lever arm 53 is moved downwardly about a pivot 3 or 3′ located on plate or link 54. The arm 53 is pivoted at 2 on the carriage and has two spaced rollers or pivots 58, 60 in the short portion of the arm respectively in tracks or slots 62, 64 in link 54. Screws 67, 68 secure the serpentine spring 70 and the rollers to the arm with the spring extending across the space between the rollers in position to be on either side of the raised pyramidal protrusion or hump 72 when the handle 52 is "up". This functions as a detent and develops a spring force holding either roller 58 or 60 in the end portion (curved on radius R1 or R2) of the associated track or slot to function as the active pivot.

Figure 10:
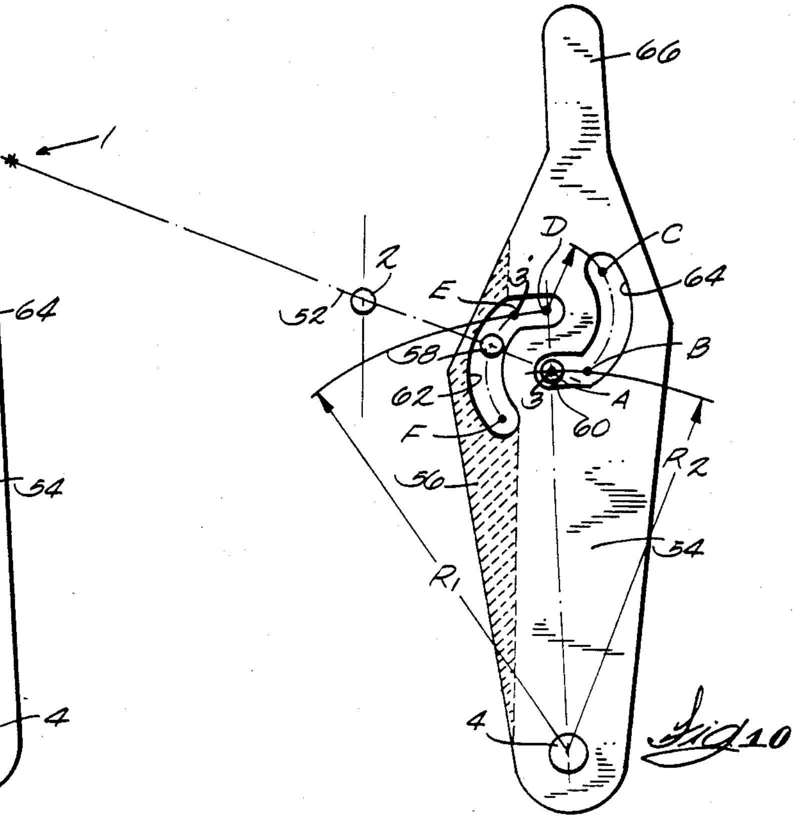
Figure 11:
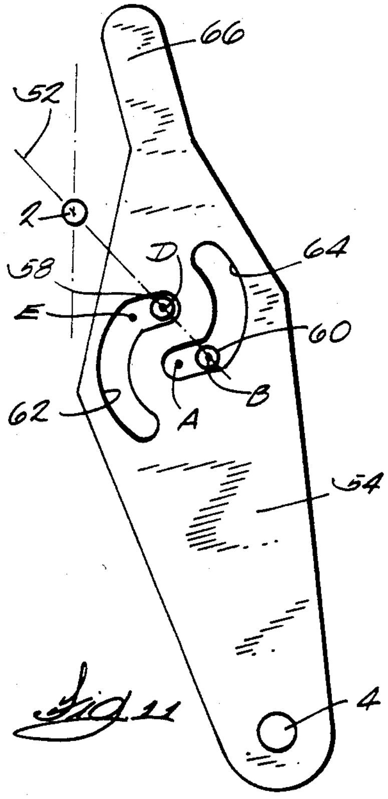

The dual pivot arrangement provided by this invention is best understood by referring to FIGS. 9–12. In FIG. 10 it will be noted that points A and D are on a line 4-A-D. The curved part of track 62 is an arc centered on A. At point E the slot 62 is extended to point D on radius R1 centered on 4. The slot 64 is curved from C to B on an arc centered on D and is extended from B to A on a radius R2 centered on 4. The distance between pivot locations A and D is less than the spacing between the pivots or rollers 58, 60 on the short portion of the lever arm 53. Therefore, only one roller can be at a pivot location at one time. When roller 60 is at A and handle 52 is moved down (from FIG. 9) roller 58 must follow track 62 and roller 60 can't leave point A. Therefore, lever arm 53 pivots about A and the carriage (connected at 2) moves down at a ratio of the distance $2-3$ divided by the distance $1-3$. The force multiplication is the inverse: i.e., $(1-3)\div(2-3)$.

Figure 6:
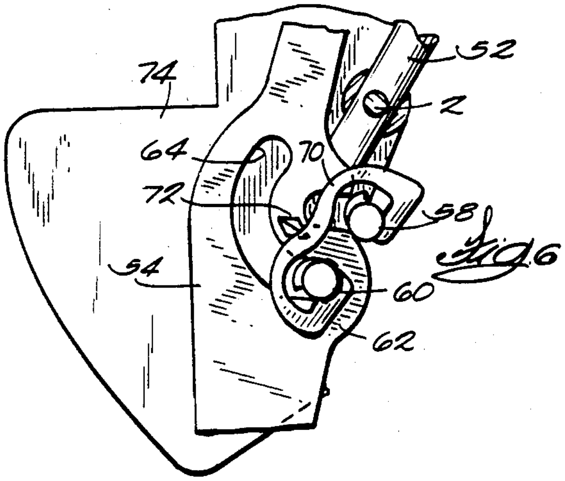
FIG. 6 shows the detent in one of its positions.
Figure 5:
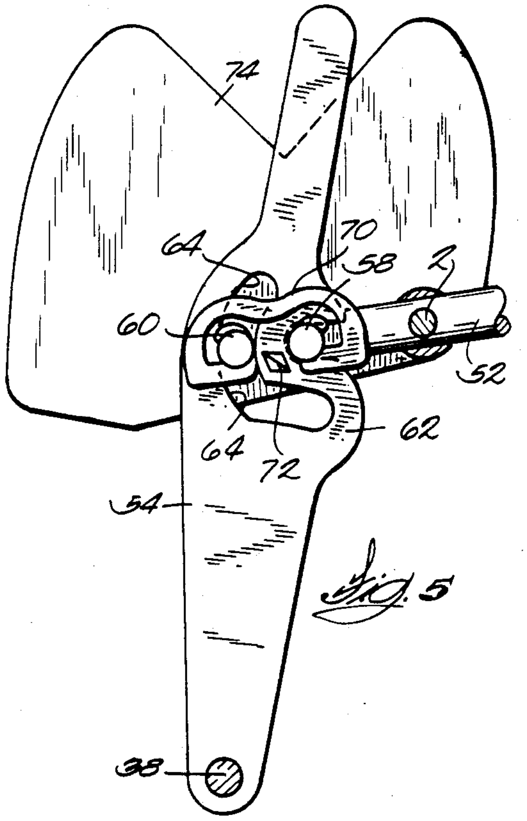
FIG. 5 is a detail of the detent arrangement.
Figure 7:
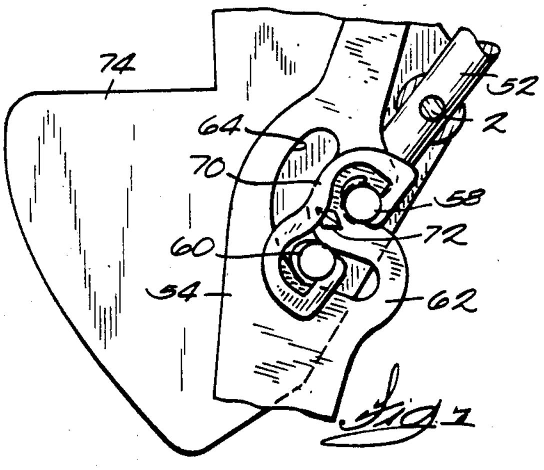
FIG. 7 shows the detent in the other of its positions.
Figure 8:
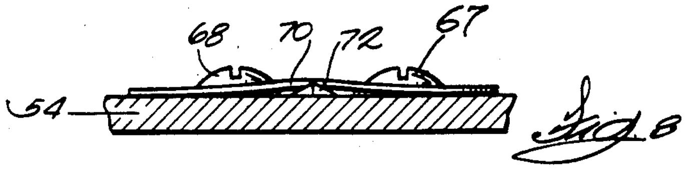
FIG. 8 is a detail of the detent spring and protrusion.
Figure 9:
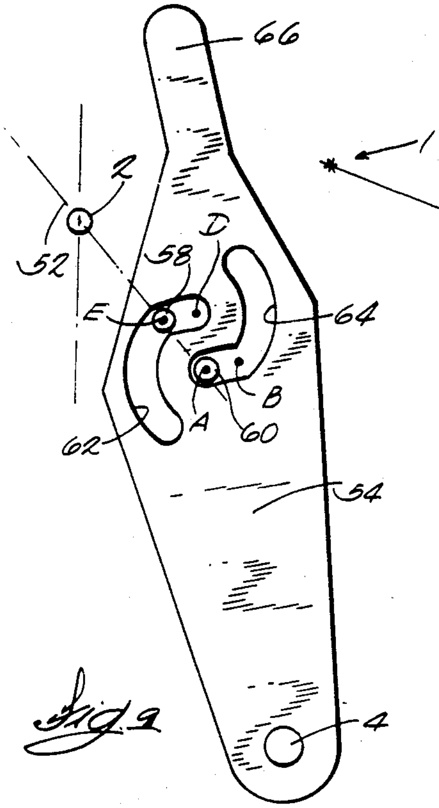
FIGS. 9–12 are simplified showings illustrating the invention.
Figure 12:
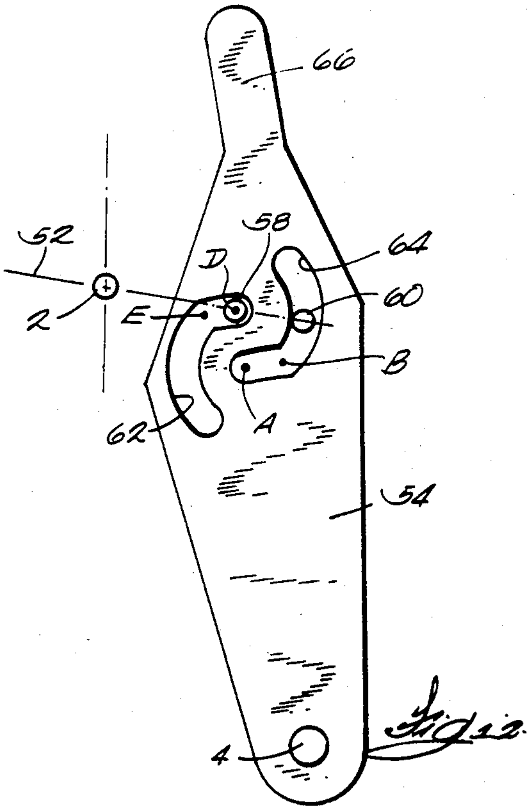

In FIGS. 10 and 12 a roller is in a curved track and there is no way for the roller at A or D (or 3 or 3′) to move out of position. When the arm is raised that positive location method is not effective so that spring 70 acting on bump 72 functions as a detent to hold the selected roller in position (FIGS. 6 and 7). The link 54 can be rocked about pivot 4 to change which of the rollers 58 and 60 will be at an active pivot location, but the link can be moved only when the arm is up . . ., i.e., once one of the rollers is in the curve about A or D the plate can't be moved. The closed curved tracks 62, 64 shown in FIGS. 9–12 are not necessary since the spacing of the rollers prevents the rollers from moving away from the curve. Thus, the shaded area 56 in FIG. 10 is unnecessary and is omitted to gain clearance in the actual link 54 shown in FIGS. 2 and 5–7. The "ouside" of curved track 64 could also be omitted but not since the added clearance is not needed. In the full up position of the arm only one roller gets onto the line 4-A-D as the upper end 66 of the plate is shifted forwardly or rearwardly to put roller 60 or 58 in an active pivot position. The spring 70 deflects to pass over the bump 72 during the shift. With the lever arm raised as in FIG. 9 it will be clear that the link can be rocked counter-clockwise to move roller 58 from E to D while roller 60 moves from A to B (to the position in FIG. 11). This can be done since the track portions E–D and A–B are on radii R1 and R2 which are centered at 4, the center pivot of the link movement.

I claim:

1. A drill stand comprising a vertical column, a clamp moveably mounted on said column a carriage adapted to support a drill and moveably mounted on said column for movement with and with respect to said clamp, a link pivoted on said clamp and having two pivot locations, and a manually actuated lever arm pivotally connected to said carriage and having pivot means selectively engagable with either of said pivot locations to change the force multiplication and travel distance as said arm is pivoted about the selected pivot location.

2. A drill stand according to claim 1 in which said pivot means comprises spaced rollers on said lever arm.

3. A drill stand according to claim 2 in which said link is provided with two tracks each of which has one portion on a curve centered on the pivot connection of said link to said clamp, each of said pivot locations being at the end of said one portion, said one portion of each said track leading to another portion on an arc centered on the pivot location associated with the other of said tracks.

4. A drill stand according to claim 3 in which each of said rollers engages one of said tracks, said pivot locations being closer together than are said rollers so only one roller can be in a pivot location at one time.

5. A drill stand according to claim 4 in which said link can be moved about its pivot connection to said clamp to select which of said rollers will be in its associated pivot location only when said arm is in its raised position.

6. A drill stand according to claim 5 including detent means effective when said arm is in said raised position to yieldably retain a selected roller in its pivot location.

7. A drill stand according to claim 6 in which said detent means includes a protrusion on said link and a leaf spring engagable with said protrusion when said arm is in said raised position, said spring being deflected as the link is moved to change the active pivot.

8. A drill stand according to claim 3 in which the radius of each said arc is the same as the spacing of said rollers.

* * * * *